May 6, 1924.　　　　　　　　　　　　　　　　　　1,492,673
C. L. CASE
PISTON PACKING
Filed March 5, 1921
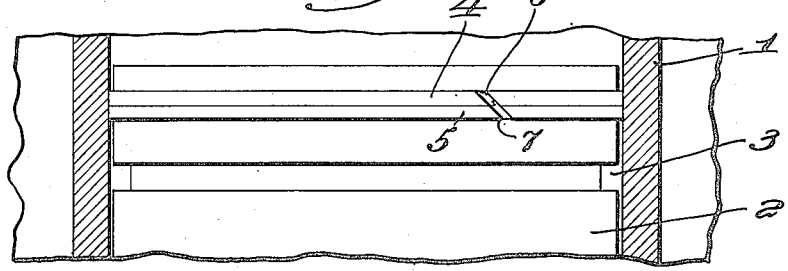
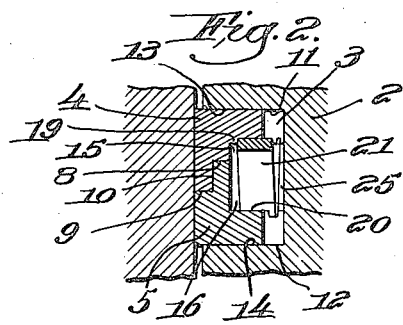 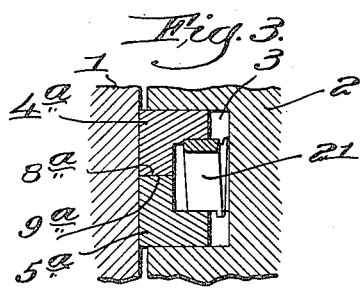
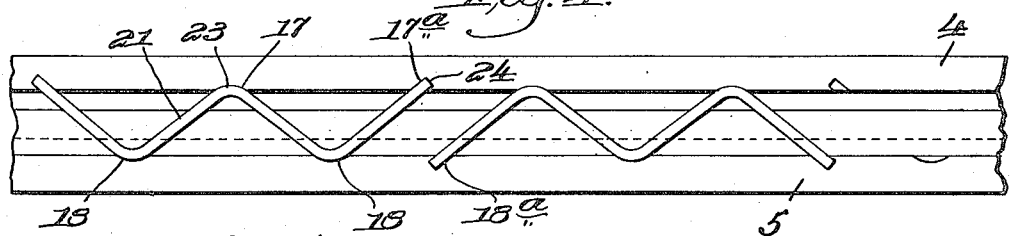
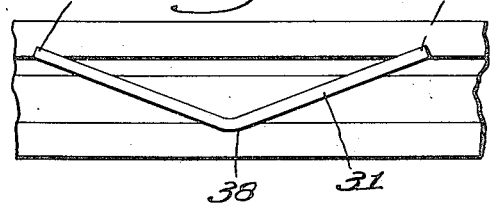 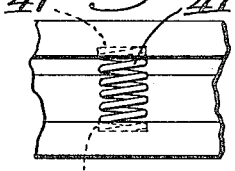 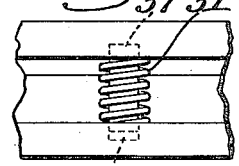
Inventor:
Charles L. Case,
by Roberts Roberts & Cushman
his Attys.

Patented May 6, 1924.

1,492,673

UNITED STATES PATENT OFFICE.

CHARLES L. CASE, OF WINCHESTER, MASSACHUSETTS, ASSIGNOR TO PRESSURE PROOF PISTON RING COMPANY, OF BOSTON, MASSACHUSETTS, A CORPORATION OF MASSACHUSETTS.

PISTON PACKING.

Application filed March 5, 1921. Serial No. 449,729.

*To all whom it may concern:*

Be it known that I, CHARLES L. CASE, a citizen of the United States of America, and resident of Winchester, in the county of Middlesex and State of Massachusetts, have invented new and useful Improvements in Piston Packings, of which the following is a specification.

This invention relates to piston packings and more particularly to that type of packing which is especially designed to prevent appreciable escape of gas between it and the end wall of its groove.

The object of the present invention is to provide a packing of simple and improved form which shall at all times fit snugly against both side walls of the piston groove whereby not only to obstruct the leakage of gas but also to restrain such ring against any appreciable axial reciprocation in its groove.

A preferred arrangement of parts for carrying this object into effect is illustrated in the accompanying drawings in which—

Fig. 1 is a fragmentary diametral cross section of an engine cylinder showing a piston therein provided with a packing of the type forming the subject of this application.

Fig. 2 is a fragmentary cross section to enlarged scale through the piston and cylinder wall showing the packing in position.

Fig. 3 is a view similar to Fig. 2 but illustrative of a modified form of ring.

Fig. 4 is a development of the packing ring of Fig. 2 looking from the right-hand side of said figure.

Fig. 5 is a view similar to Fig. 4 but illustrating a modification; and

Figs. 6 and 7 are fragmentary views similar to Fig. 4 but showing further modifications.

The wall of an engine cylinder of ordinary construction is illustrated at 1. The piston 2 may be provided with one or more circumferential grooves 3 of usual construction for the reception of the piston packing devices. The piston packing herein disclosed comprises a pair of complemental rings 4, 5, such rings being split as indicated at 6, 7, to provide for their radial expansion in the usual manner. The radial, mutually engaging surfaces of said rings are preferably divided into two portions 8, 9, having interposed therebetween peripheral engaging surfaces as indicated at 10. With this arrangement slight axial movement of the rings is permitted while maintaining a tight joint therebetween. The side walls of the piston groove indicated at 11, 12, respectively, engage the surfaces 13, 14 of the rings 4, 5.

The rings 4, 5, are provided with complemental recesses 15, 16, which together form a spring receiving chamber. Preferably such recesses will be of annular form, thus providing an annular chamber or channel open at the inner face of the combined packing device. The oppositely facing walls 19, 20, of said chamber may be provided with pockets or recesses 17, 17ª, 18, 18ª, respectively. With such pockets may be engaged the bends 23 and the ends 24 of zigzag or W-shaped springs 21, the bends thereof engaging the pockets 17, 18 and the ends engaging the pockets 17ª, 18ª, of the respective rings. Such zigzag springs are preferably formed of flat ribbon like material suitably bent and tempered. These springs, while tending to urge the rings 4, 5, in opposite directions whereby to maintain their surfaces 13, 14, in close engagement with the side walls 11, 12, respectively of the groove 3, are spaced from the inner or bottom walls of the groove 3 as indicated at 25. Thus the spring exerts no radial outward pressure upon the packing rings and by reason of the fact that they do not engage the piston groove, any tendency of the springs to wear recesses in the walls of such groove is avoided. With the arrangement described, it is clear that the springs 21, being carried by the packing rings and having no engagement with any other part, are free to move outwardly with such rings when the latter expand.

While the slip joint arrangement indicated in Fig. 2 between the rings 4 and 5 is preferred, a butt joint such as indicated at 8ª, 9ª between the rings 4ª, 5ª of Fig. 3 may be employed.

By the seating of the springs 21 in pockets in the opposite faces of the rings 4, 5, it is clear that any tendency of the latter to rotate relatively one to the other is prevented, while by reason of the constant pressure of each spring in an axial direction any reciprocation of the packing within the groove 3 is avoided. The packing is thus at all times maintained in such operative relation to the piston groove as to prevent leakage of gas therethrough, while at the same time any tendency of the packing to rock in its groove or to move longitudinally therein with attendant wear upon the groove and cylinder walls is avoided.

It is to be understood of course, that while in a preferred arrangement each spring 21 will be of substantially W-shape, a series of such springs being provided extending along the annular chamber between the rings, it is possible to form a single spring of zigzag form extending throughout the entire length of the chamber. While springs of W form are preferred a spring 31 of V form such as shown in Fig. 5 may be employed if desired, such spring having a bend 38 engaging a suitable pocket in one of the rings and end portions 34 engaging pockets in the other ring.

In Fig. 6 there is shown a further modification in which, in place of the flat bent springs illustrated in the preceding figures, a helical coil spring 41 is employed, such spring being seated at its opposite ends in pockets 47, 48, in the respective rings. In Fig. 7 a still further modification is illustrated, in which a helical spring 51 is positioned by means of a post 57 secured in one of the rings and engaging a pocket 58 in the other ring. While but a single spring has been shown in each of the last described cases, it is evident that a series of such springs will be employed properly spaced about the packing device.

It is furthermore clear that while the device shown in Figs. 2 and 4 is a preferred form, the spring arrangements shown in the other figures serve in a similar manner both to urge the rings in opposite directions and also to restrain the rings against rotation.

Having thus described the invention in a preferred embodiment of the same together with the mode of operation thereof, what I claim and desire to secure by Letters Patent of the United States is:

1. A packing for use with a unitary metallic piston having a circumferential groove, comprising a pair of complemental radially expansible split rings provided respectively with grooved engaging radial faces and having peripherally overlapping portions and complemental recesses in their inner faces collectively constituting a continuous circumferential groove, and a plurality of independent circumferentially spaced springs within said groove positioned wholly by engagement with the respective rings and constructed and arranged to exert force in an axial direction only for urging the respective rings into contact with the side walls of the piston groove, one at least of the split rings having means engaging the springs for preventing relative circumferential movement of the latter.

2. A packing for use in the groove of a unitary metallic piston comprising a pair of independent radially resilient split ring members having peripherally engaging surfaces, and a plurality of independent springs interposed between opposed faces of said rings, each spring having its ends disposed to engage one of the rings and an intermediate part arranged to bear directly against the other ring, said springs collectively exerting a force in an axial direction only normally tending to move said rings in opposite directions axially of the piston.

3. A packing for use with a unitary piston having a circumferential groove, comprising a pair of expansible split rings provided with peripherally overlapping portions and having complemental recesses forming a spring receiving chamber, and a series of circumferentially spaced independent springs within said chamber, each spring having portions bearing against the respective rings whereby to urge them in opposite directions, the rings being furnished with elements cooperating with the bearing portions of the several springs to prevent circumferential movement thereof relatively to the rings.

4. A packing device comprising a pair of radially resilient rings having complemental recesses therein forming a spring receiving chamber, spring positioning means, and a series of independent springs of W shape engaging said positioning means and bearing against elements of the respective rings, alternate springs of the series being inverted relatively to the others.

5. A packing of the class described comprising a pair of rings having complemental annular recesses therein forming an annular chamber, a series of spring positioning pockets formed in the walls of said chamber, and a plurality of peripherally disposed springs engaging said pockets.

6. A packing device comprising a pair of complemental expansible rings having a chamber therebetween, and a series of independent flat springs of W form within said chamber and engaging pockets in opposed faces of the respective rings whereby simultaneously to urge said rings oppositely in an axial direction and to prevent axial rotation of said rings.

7. In combination with a unitary piston having a peripheral groove therein, a packing seated within said groove and comprising complemental expansible split rings provided with peripherally engaging surface, said rings being of an internal diameter greater than that of said groove and having an annular chamber therebetween open at the inner face of said rings, a series of independent flat springs of sinuous form within said chamber reacting against said rings to urge them oppositely into contact with the side walls of said groove, said springs being free from engagement with the bottom wall of said groove and being constructed and arranged to react against said rings in substantially an axial direction only, and spring positioning means carried by the respective rings.

8. In combination with a unitary piston having a circumferential groove therein, a pair of radially expansible split rings in said groove, said rings having peripheral engaging surfaces, and a series of independent circumferentially spaced springs free of engagement with said piston, for urging said rings oppositely into engagement with opposite walls of the groove, said springs having portions thereof seated in positioning recesses in the rings.

Signed by me at Boston, Massachusetts, this first day of March, 1921.

CHARLES L. CASE.